(12) United States Patent
Haloui et al.

(10) Patent No.: US 9,873,628 B1
(45) Date of Patent: Jan. 23, 2018

(54) FILAMENTARY CUTTING OF BRITTLE MATERIALS USING A PICOSECOND PULSED LASER

(71) Applicant: Coherent Kaiserslautern GmbH, Kaiserslautern (DE)

(72) Inventors: Hatim Haloui, Kaiserslautern (DE); Christoph O. Schäfer, Dellfeld (DE)

(73) Assignee: Coherent Kaiserslautern GmbH, Kaiserslautern (DE)

(*) Notice: Subject to any disclaimer, the term of this patent is extended or adjusted under 35 U.S.C. 154(b) by 0 days.

(21) Appl. No.: 14/932,575

(22) Filed: Nov. 4, 2015

Related U.S. Application Data

(63) Continuation of application No. 14/558,607, filed on Dec. 2, 2014, now abandoned.

(51) Int. Cl.
| | |
|---|---|
| *C03B 33/023* | (2006.01) |
| *B23K 26/064* | (2014.01) |
| *C03B 33/10* | (2006.01) |
| *B23K 26/38* | (2014.01) |
| *B23K 26/06* | (2014.01) |
| *B23K 26/0622* | (2014.01) |

(52) U.S. Cl.
CPC ........ *C03B 33/102* (2013.01); *B23K 26/0624* (2015.10); *B23K 26/0648* (2013.01); *B23K 26/38* (2013.01); *C03B 33/023* (2013.01)

(58) Field of Classification Search
None
See application file for complete search history.

(56) References Cited

U.S. PATENT DOCUMENTS

| | | | |
|---|---|---|---|
| 7,388,172 B2* | 6/2008 | Sercel | B23K 26/0608 219/121.69 |
| 7,626,138 B2 | 12/2009 | Bovatsek et al. | |
| 9,102,007 B2 | 8/2015 | Hosseini | |
| 9,102,011 B2 | 8/2015 | Hosseini | |
| 2007/0170159 A1 | 7/2007 | Fukumitsu | |
| 2007/0272669 A1* | 11/2007 | Comley | B23K 26/0604 219/121.76 |
| 2012/0234807 A1 | 9/2012 | Sercel et al. | |
| 2013/0126573 A1 | 5/2013 | Hosseini et al. | |
| 2014/0199519 A1* | 7/2014 | Schillinger | B23K 26/0648 428/155 |

OTHER PUBLICATIONS

Sirohi et al., "Optical Components, Systems, and Measurement Techniques", Marcel Dekker, Inc., 1991, p. 89.*

(Continued)

*Primary Examiner* — Lisa L Herring
(74) *Attorney, Agent, or Firm* — Morrison & Foerster LLP

(57) ABSTRACT

In pulsed-laser apparatus for filamentary cutting a glass-sheet, a laser-beam is focused by a plano-convex focusing lens into the glass-sheet through a first surface of the sheet to a point close to a second surface of the sheet. Pulses from the laser are delivered in repeated bursts. The laser-beam fills the clear-aperture of the lens such that uncorrected spherical aberration in the focusing lens causes radial modulation of the beam between the lens and the focus point. This provides that each burst of pulses generates a filament extending between the first and second surfaces of the sheet.

9 Claims, 6 Drawing Sheets

(56) References Cited

OTHER PUBLICATIONS

Bhuyan et al., "High Aspect Ratio Taper-free Microchannel Fabrication using Femtosecond Besse! Beams", Optics Express, vol. 18, No. 2, Jan. 18, 2010, pp. 566-574.
Couairon et al., "Femtosecond Filamentation in Transparent Media", Physics Reports, vol. 441, 2007, pp. 47-189.
Courvoisier et al., "Filamentation of Femtosecond Nondiffracting Beams Applications to Laser Ablation", Femto-St, FRGLS, 2013, pp. 1-36.
Papazoglou et al., "Tunable Intense Airy Beams and Tailored Femtosecond Laser Filaments", Physical Review, vol. A 81, 2010, pp. 061807-1-061807-4.
Strigin et al., "Laser Processing of Glass by Picosecond Pulses", Quantum Electronics, vol. 24, No. 8, 1994, pp. 732-735.
Yoshino et al., "High Energy-High Repetition Rate Fiber Laser System for Precision Micromachining with Fundamental and Second Harmonic Wavelengths", Journal of Laser Micro/Nanoengineering vol. 1, No. 3, pp. 258-263.

* cited by examiner

FILAMENTARY CUTTING OF BRITTLE MATERIALS USING A PICOSECOND PULSED LASER

PRIORITY

This application is a continuation of U.S. Ser. No. 14/558,607, filed Dec. 2, 2014, the entire disclosure of which is incorporated herein by reference.

TECHNICAL FIELD OF THE INVENTION

The present invention relates in general to laser machining of brittle materials. The invention relates in particular to cutting glass using a picosecond laser to cut a glass-sheet by creating a filament curtain therein.

DISCUSSION OF BACKGROUND ART

A proliferation of so-called "smart phones" has created renewed interest in cutting glass and sapphire using laser radiation. Typically a smart phone has a transparent cover plate that can be a single sheet cover plate or a multilayer cover plate. In either case, an outer sheet is typically of a chemically strengthened glass with surface regions thereof under high compressive stress. A usual shape for the sheet is a rectangle with rounded corners. A very fine finished edge is required. This provides a challenge for most accepted cutting methods because of the brittle nature of the chemically strengthened glass and a tight radius of the rounded corners, typically a few millimeters (mm). The amount of material to be cut is enormous, as such smart phones are sold in quantities of millions, with new models appearing almost annually.

Recently, a method of using pulsed lasers has been advertised as ideal for cutting chemically strengthened glass. The pulses have a wavelength of about 1064 nanometers (nm) and a duration of less than about 10 picoseconds (ps). The pulses are delivered in bursts of about 5 pulses separated in time by a few nanoseconds (ns), with bursts delivered at a repetition rate of about 200 kilohertz (kHz). The pulses are delivered in a manner which causes the formation of elongated filaments (voids) in the glass. The filaments extend almost completely through the thickness of the sheet. The glass is moved during the delivery of the pulses so that a "curtain" of such filaments is produced along cutting path. The glass can then be separated along the cutting path by applying mechanical pressure, or may separate spontaneously along the cutting path.

This process is described, in principle at least, in U.S. Pre-Grant Publication No. 2013/0126573. What is missing from the description is a description of focusing optics used for delivering the pulses to the glass. Using focusing optics generally accepted and useful for other laser machining processes, the inventors were not able to reproduce the results described in the publication, even after many months of experimentation.

Before the filing date of the '573 publication, it was known that filaments could be created in glass when drilling high aspect-ratio holes using femtosecond and picosecond laser pulses. A particularly favored method to create filaments included using focusing optics to generate an elongated focal region in the glass. These beams are generally referred to as Bessel beams by practitioners of the art.

Such Bessel beams have been produced by including a non-conventional optical element such as an axicon in the focusing optics. Bessel beams have also been generated by including a phase-mask (transparent diffractive element) in the focusing optics. Axicons and phase-masks are expensive elements to produce, primarily because they are not suited to batch (volume) production. Accordingly, without any guarantee that Bessel-beam optics were the "missing link" in the '573 document, it was decided by the inventors to devise a simpler arrangement for generating filaments in glass and other brittle materials which could be the key to reproducing the results described therein.

SUMMARY OF THE INVENTION

In one aspect, laser apparatus for filamentary cutting of a glass-sheet having an entrance surface and an exit surface, comprises a laser delivering pulses having a duration of about 15 picoseconds or less with a temporal separation therebetween of about 100 ns or less. The pulses are delivered in bursts of between 2 and 10 pulses at a burst-repetition rate between about 100 kilohertz and about 500 kilohertz, with the pulses delivered in a collimated beam having a first diameter. A focusing-lens is provided, the lens having an optic-axis and a nominal focus at an effective focal-distance from the lens and a clear-aperture. The clear-aperture has a second diameter greater than the first diameter. An afocal beam-expander is located between the laser and the focusing-lens. The beam-expander is arranged to expand the diameter of the collimated beam from the first diameter to the second diameter, thereby filling the clear-aperture of the lens. The filling of the clear-aperture exploits uncorrected spherical aberration in the lens, thereby causing the beam to exhibit radial modulation of intensity about the optic-axis in planes between the lens and the nominal focus. The focusing lens is located relative to the glass-sheet such that the nominal focus of the lens is below the entrance surface of the glass-sheet. Each burst of pulses generates an elongated filament extending at least part way between the entrance and exit surfaces of the glass-sheet. The subject invention can also be used for a cutting other brittle materials such as sapphire and silicon.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

BRIEF DESCRIPTION OF THE DRAWINGS

Figure 1:
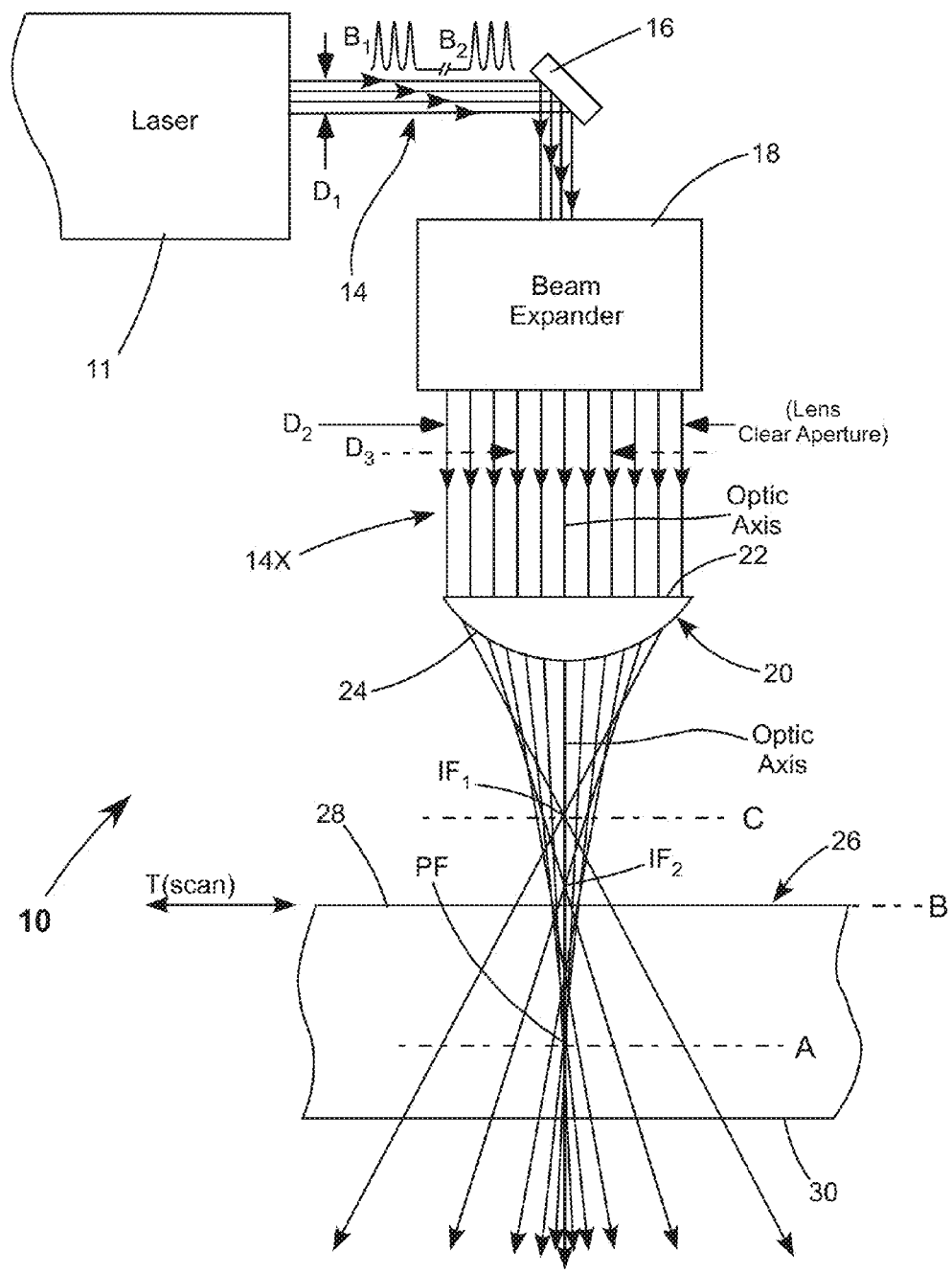

FIG. 1 schematically illustrates one preferred embodiment of filamentary glass cutting apparatus in accordance with the present invention including a mode-locked laser delivering laser pulses in a collimated beam, a beam expander for expanding the diameter of the collimated laser-beam to the clear-aperture diameter of a focusing lens arranged to receive the expanded laser-beam and focus the expanded laser-beam with a principle focus within a relatively thick sheet of glass being cut, and intermediate foci between the principle focus and the lens.

Figure 1A:
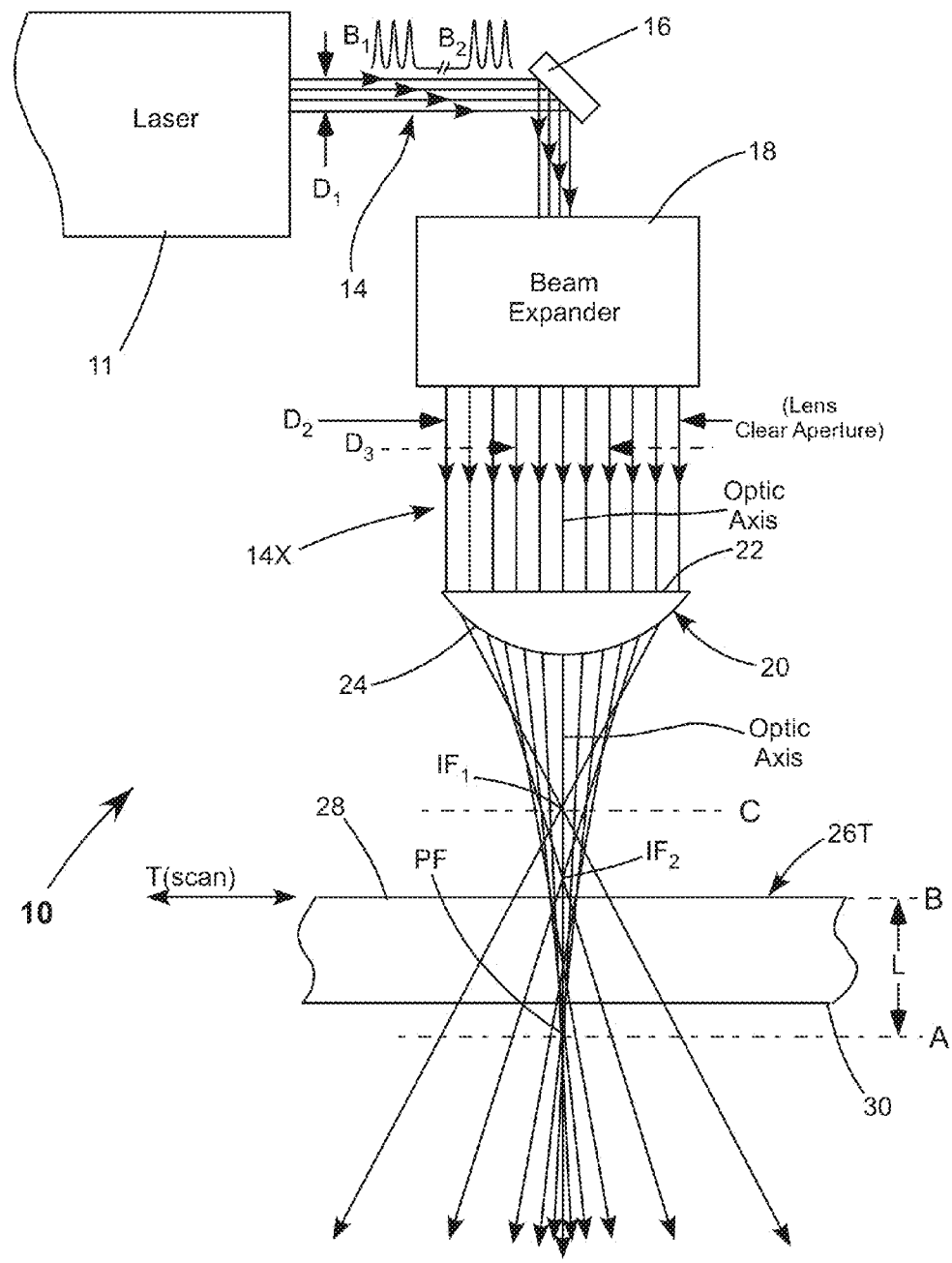

FIG. 1A schematically illustrates another preferred embodiment of filamentary glass cutting apparatus in accordance with the present invention similar to the apparatus of FIG. 1, but where sheet of glass being cut is relatively thin and the principle focus is below the sheet of glass.

Figure 2A:
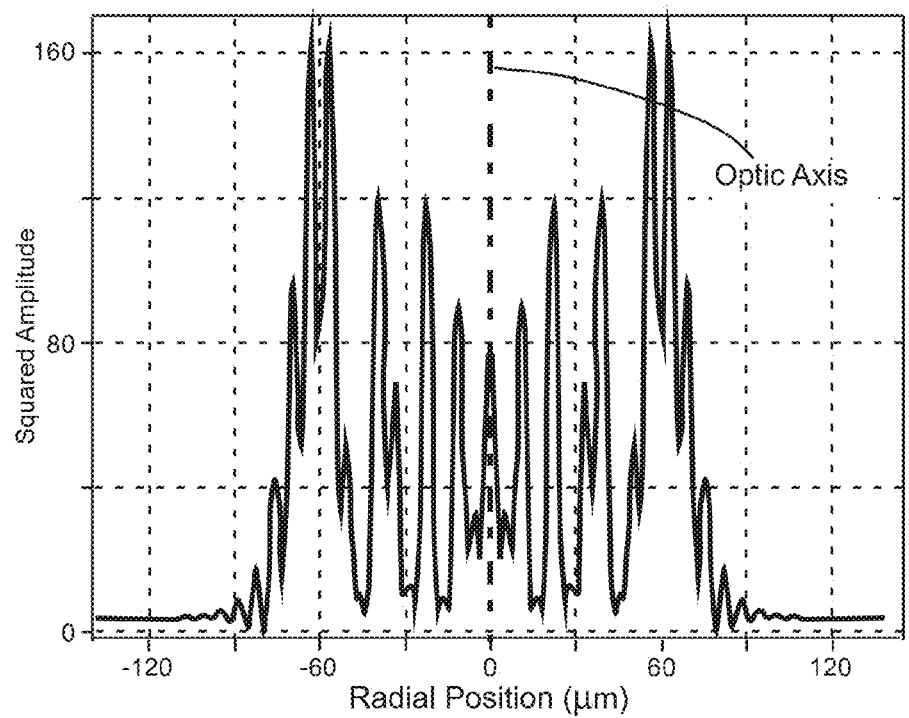

FIG. 2A schematically illustrates calculated radial distribution of electromagnetic field intensity in a plane above an entrance surface of the glass-sheet being cut in an example of the apparatus of FIG. 1, with the intensity radially modulated by intersecting rays resulting from uncorrected spherical aberration in the focusing lens.

Figure 2B:
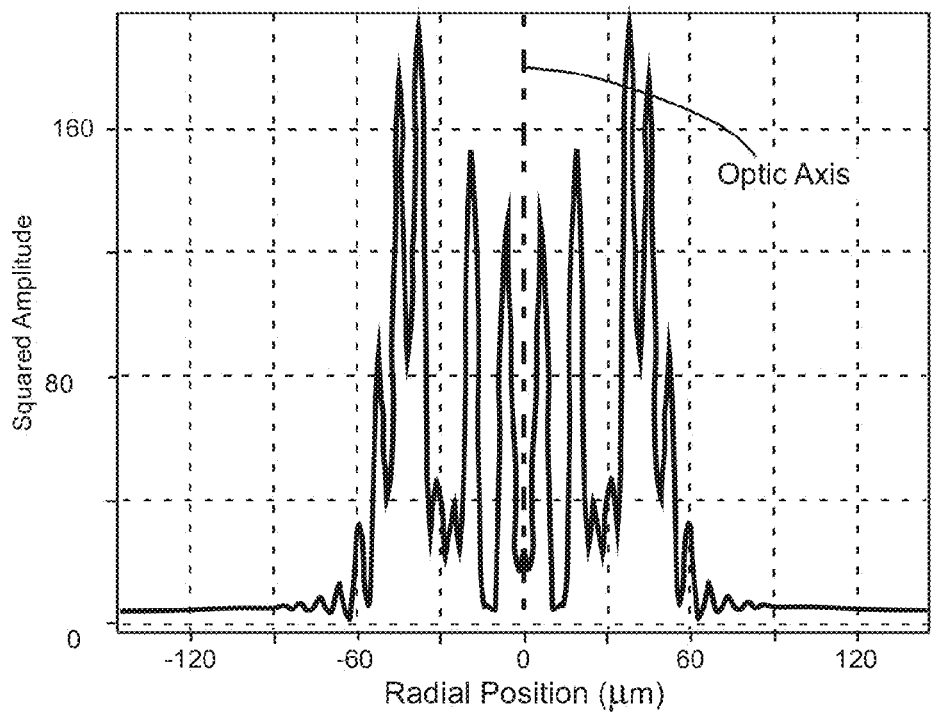

FIG. 2B schematically illustrates calculated radial distribution of electromagnetic field intensity in a plane corresponding to the entrance surface of the glass-sheet being cut in an example of the apparatus of FIG. 1, with the intensity radially modulated by intersecting rays resulting from uncorrected spherical aberration in the focusing lens.

Figure 2C:
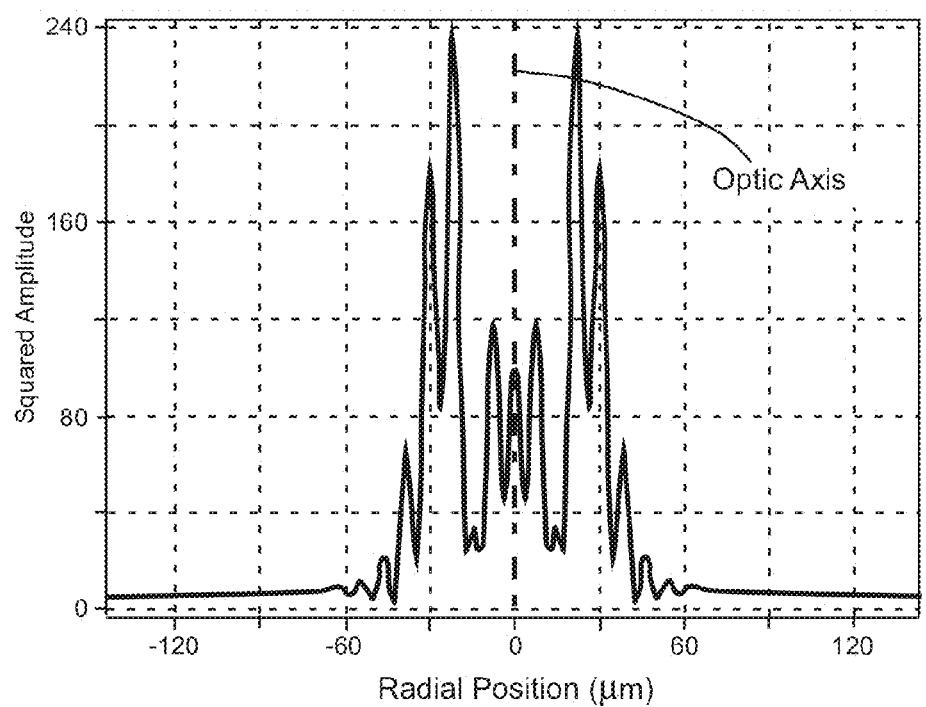

FIG. 2C schematically illustrates calculated radial distribution of electromagnetic field intensity in a plane above the nominal focus of the focusing lens of glass-sheet being cut in an example of the apparatus of FIG. 1, with the intensity radially modulated by intersecting rays resulting from uncorrected spherical aberration in the focusing lens.

Figure 2D:
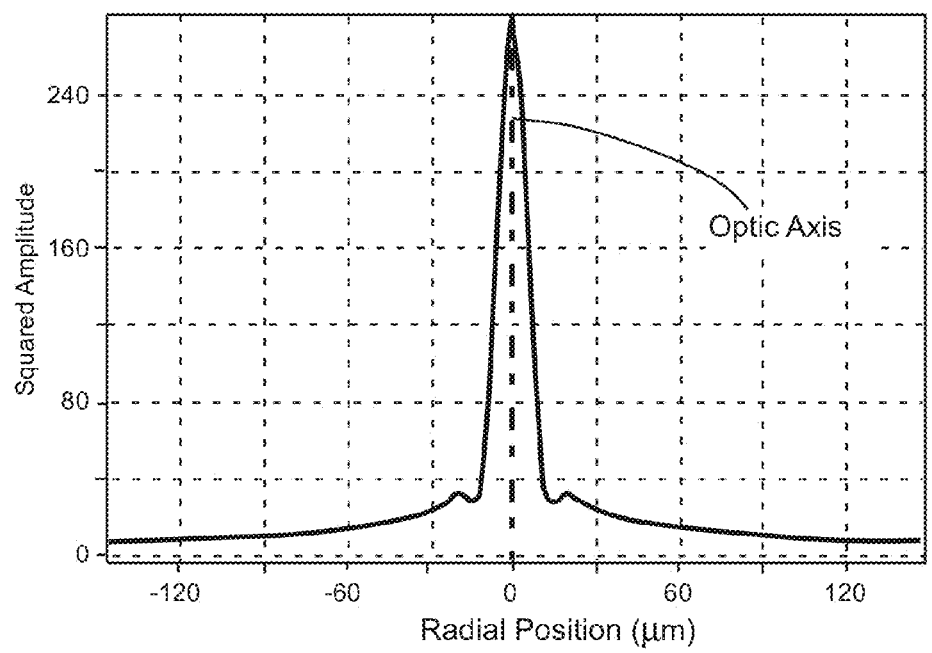

FIG. 2D schematically illustrates calculated radial distribution of electromagnetic field intensity in a plane corresponding to the nominal focus of the focusing lens of glass-sheet being cut in an example of the apparatus of FIG. 1

Figure 3A:
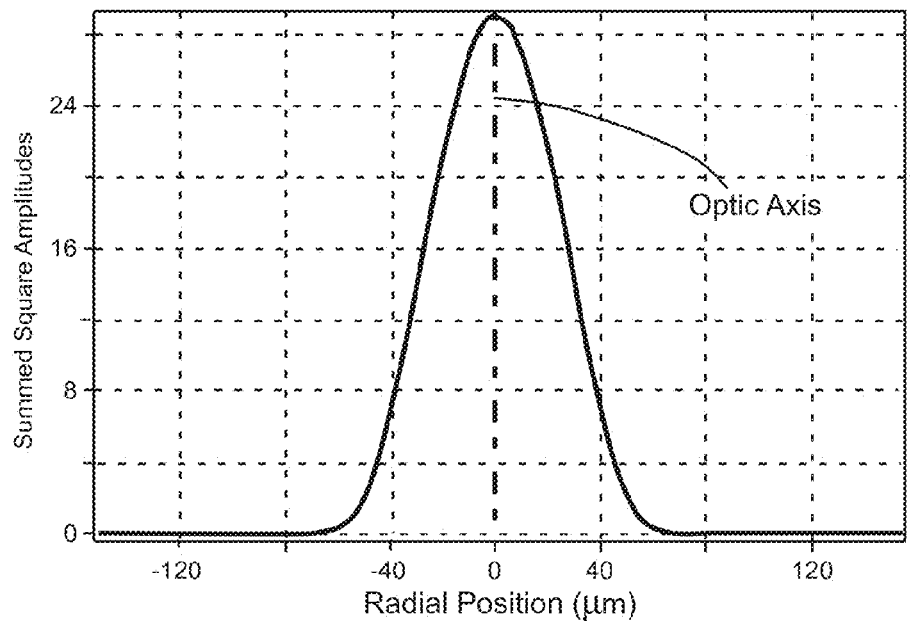

FIG. 3A schematically illustrates calculated radial electromagnetic field intensity in a plane corresponding to an entrance surface of the glass-sheet being cut, when the beam is expanded to a diameter significantly less than the clear-aperture of the focusing lens to avoid the effects of uncorrected spherical aberration, as is usual in the prior-art.

Figure 3B:
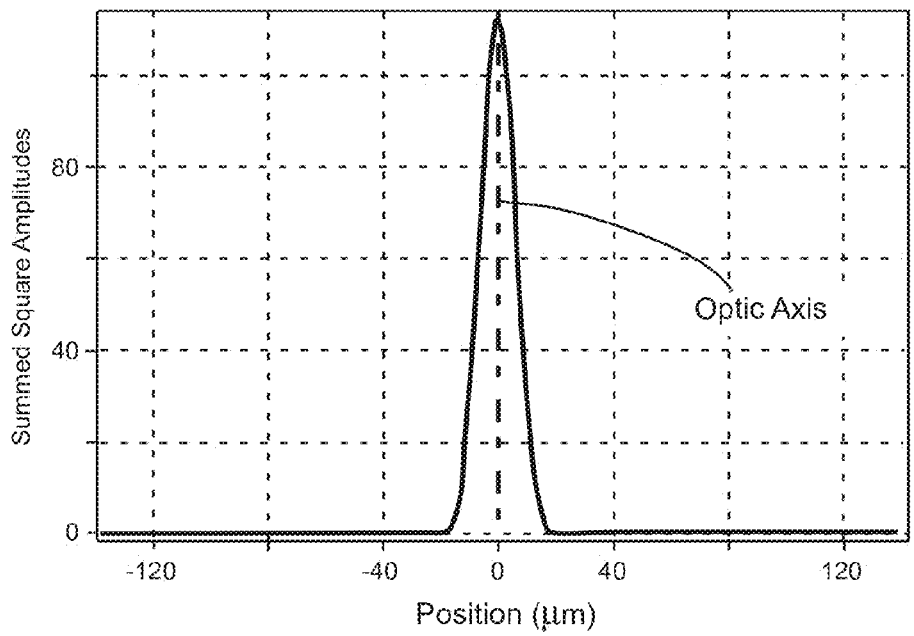

FIG. 3B schematically illustrates calculated radial electromagnetic field intensity in a plane through the principle focus of the focusing lens of FIG. 1 when the expanded beam has the diameter assumed in FIG. 3A.

Figure 4:
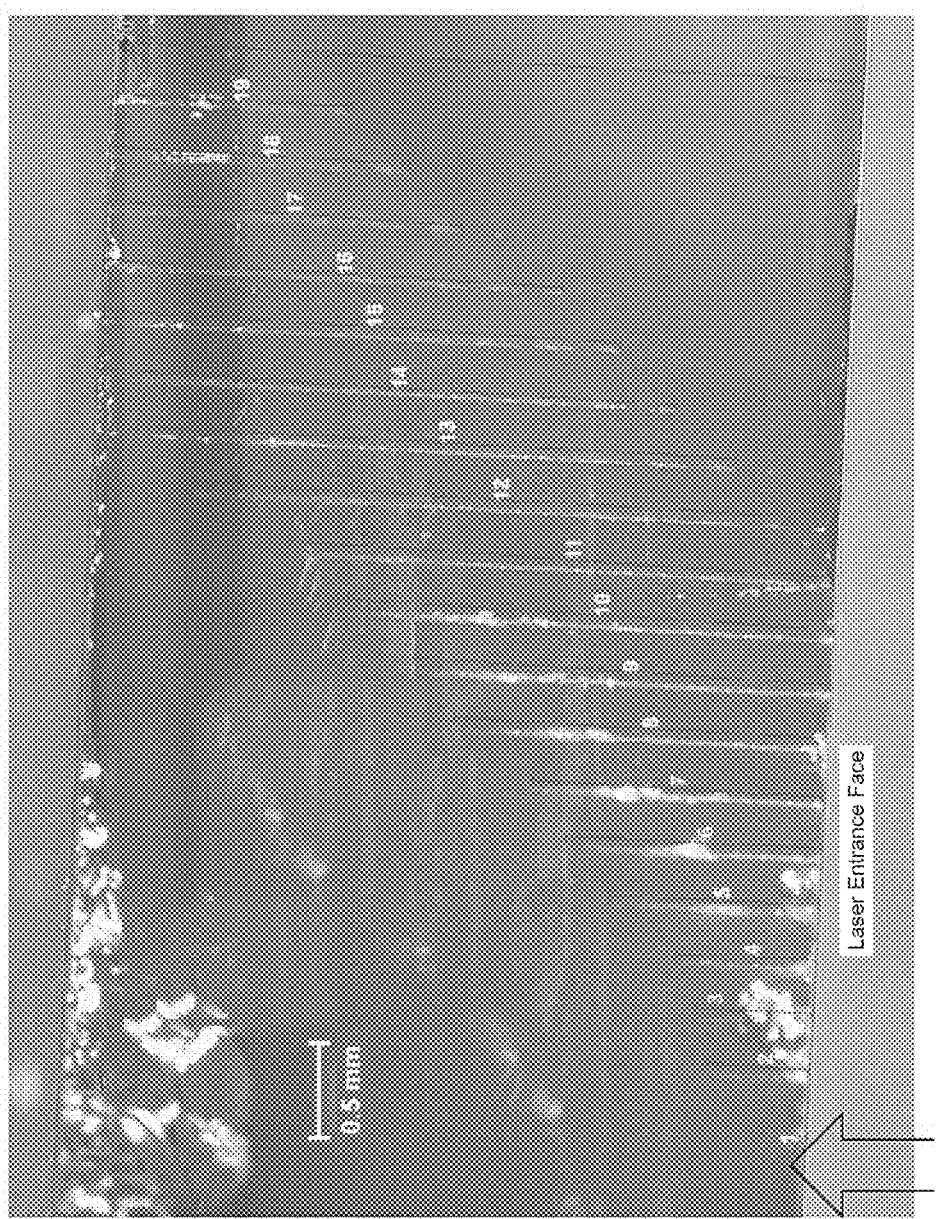

FIG. 4 schematically illustrates nineteen filaments sequentially formed by an example of the apparatus of FIG. 1 in a glass-sheet, with the focusing lens fully illuminated, and with the nominal focus of the focused laser-beam at the entrance of the glass-sheet for the first filament, with the depth of the nominal focus in the glass-sheet incrementally increased for subsequently formed filaments.

DETAILED DESCRIPTION OF THE INVENTION

Turning now to the drawings, wherein like features are designated by like reference numerals, FIG. 1 schematically illustrates a preferred embodiment 10 of laser apparatus in accordance with the present invention for filamentary cutting glass. Apparatus 10 includes a mode-locked pulsed laser 11 arranged to deliver pulses in bursts of pulses, for example $B_1$ and $B_2$, with pulses in the bursts separated by between about less than about 100 nanoseconds, and with the bursts deliverable at a burst-repetition frequency between about 100 kHz and about 500 kHz. The pulses have a duration of about 15 ps or less.

The burst-repetition frequency determines the temporal separation of the multi-pulse bursts with 100 kHz, for example, corresponding to a separation between bursts of 10 microseconds (μs) from the beginning (first pulse) of one burst to the beginning (first pulse) of the next burst. Preferably there are between 2 and 10 pulses in a burst. One preferred temporal separation between pulses in a burst is 20 ns. This corresponds to a repetition rate of about 50 MHz.

One suitable laser for use in apparatus 10 is a HYPER RAPID50-HE master oscillator power amplifier (MOPA) laser system available from Coherent Inc. of Santa Clara, Calif. This laser system is capable of delivering pulse-bursts having an energy of 200 microjoules (μJ) at a burst repetition rate of about 200 kHz with up to 10 pulses per burst. This represents an average power of about 40 W. Pulses have a wavelength of about 1064 nm and a duration of about 10 ps. A detailed description of the architecture of such a MOPA is not necessary for understanding principles of the present invention and is not presented herein.

Continuing with reference to FIG. 1, pulse-bursts are delivered in a collimated beam 14 having a diameter $D_1$. Beam 14 is directed by a turning mirror 16 to an afocal beam-expander 18 which expands the diameter (width) of beam 14 to provide an expanded collimated beam 14X having a diameter $D_2$. The design of afocal beam-expanders is well known in the optical art and, here again, a description thereof is not necessary for understanding principles of the present invention. Beam 14X is delivered to a plano-convex focusing lens 20, here, a single element lens having a plane surface 22 and a convex spherical surface 24. Beam diameter $D_2$ is selected to fill the clear-aperture (maximum useful diameter) of lens 20. Such a lens is readily available commercially, "off the shelf", from a number of optical component suppliers. It has been found preferable, in the inventive arrangement, to orient the lens in the manner depicted, with the convex surface of the lens furthest from the laser. Other focusing lens shapes, such as bi-convex, may be used without departing from the spirit and scope of the present invention.

Lens 20 as described will have optical aberrations such as spherical, chromatic, coma etc. These aberrations are not deliberately introduced in the lens, but are merely inherent properties of the lens element, depending on parameters including surface-curvature, axial-thickness, and glass-type. Effects of these aberrations on a focused beam are amplified the greater the fraction of the lens clear-aperture that is illuminated. In the case of focusing a collimated (monochromatic) laser-beam, only spherical aberration is significant as the "object" producing the beam is effectively a point-source at infinity.

Because of this, in prior-art practice of focusing a laser beam for laser-machining operations, the collimated beam has a diameter much less than the clear-aperture of the lens, for example, diameter $D_3$ indicated in FIG. 1. This minimizes the (uncorrected) effect of spherical aberration to a level where a single, precise focus can be achieved without a need for aberration-correction measures such as aspheric surfaces, gradient-index glass, or additional lens elements.

This is an example of the "focusing optics generally accepted and useful for other laser machining processes" referred to above in the background-art section of this document.

As noted above, in the inventive apparatus, the laser-beam is expanded to fill the entire clear-aperture of lens 20. In terms of conventional wisdom, this could be described as over-filling the lens, i.e., filling the lens beyond a point where the inherent aberration does not prevent providing a precise focus.

In the overfilled lens, an effect of the inherent spherical aberration is that rays focus closer to the lens the further the rays are from the optic axis of the lens. In the example of FIG. 1, the extreme rays focus at an incidental (intermediate) focus $IF_1$ in a focal-plane C, closest to the lens and located above an entrance surface 28 of a glass-sheet 26 to be cut. There will be other incidental foci produced by rays closer to the optic-axis of lens 20, for example, $IF_2$ in FIG. 1. In a practical cutting operation the sheet would be translated (scanned) with respect to the focused beam as indicated by arrows T. For cutting curved shapes, of course, the sheet would be scanned in two mutually perpendicular directions. A description of practical scanning-speeds is provided further herein below.

The nominal (principle) focus PF of lens 20 is in a plane A at a distance L below entrance surface 28 of glass-sheet 26. The nominal or principle focus here, is defined as being at the specified focal-length of the lens from a principle plane of the lens. This focal length is specified by designer or manufacture in air. If a focused beam passes through an intervening medium having a refractive index greater than unity, the nominal focal distance will be physically foreshortened.

This foregoing represents a static focusing condition. During the passage of a pulse through the glass sheet the dynamic behavior of the principle focus and any intermediate foci may be dynamically influenced by self-focusing of the beam due to the Kerr effect.

A preferred value for L is between about 1.0 mm and 2.5 mm, for example about 1.5 mm. In FIG. 1, glass-sheet 26 is sufficiently thick that the principle focus is within the glass-sheet, in this example, closer to an exit surface 30 than to entrance surface 28. This is the nominal focus position of the lens, i.e., the single focus that would result if beam 40X had a diameter $D_3$ or less selected such that inherent spherical aberration could be ignored. In a case where a glass-sheet being cut is relatively thin, for example, about 1 mm, the nominal focus of the lens would be below exit surface 30 of the glass-sheet as depicted in FIG. 1A for glass-sheet 26A.

As far as incidental foci resulting from over-filling the lens are concerned, in practice, with an infinite number of focused rays, there would be many incidental foci extending along the optic-axis, between focal planes A and C. It can be expected that, because of the coherence of the laser radiation, interference would occur where rays furthest from the optic-axis of lens 20 intersect with rays closer to the optic-axis of the lens. This is indeed the case in practice, and interference rings (radial intensity modulations) have been observed by direct beam-intensity profile measurement beginning in a plane of first observation (not shown) a short distance from the lens (sufficient that enough rays can intersect to create the interference) everywhere along the optic axis between the plane of first observation and the nominal focus.

FIG. 2A is a graph schematically illustrating calculated radial distribution of electro-magnetic field intensity in a plane about 0.35 mm above surface 28 of glass-sheet 26 of FIG. 1. The modulations depicted are along a line through the optic-axis and would be of annular (ring) form in a plane perpendicular to the optic axis. It is assumed that energy intensity distribution in the collimated beam entering the lens is Gaussian. It is further assumed that lens 20 has a nominal focal-length of 50 mm and a diameter of 25 mm, with beam 14X having a diameter of 24 mm (equal to the clear-aperture of the lens). The principle focus is assumed to be 1.5 mm below entrance surface 28 of sheet 26.

FIG. 2B is a graph similar to the graph of FIG. 2A but calculated for a plane B of FIG. 1 corresponding to the entrance surface of the glass-sheet. The modulations are similar but less with the beam width less than that in the graph of FIG. 2A.

FIG. 2C is a graph similar to the graph of FIG. 2A but calculated for a plane about 0.35 mm above the nominal-focus plane A. The number of modulations is less and the beam-diameter smaller than that of FIG. 2B, but the modulation depth has increased.

FIG. 2D is a graph similar to the graph of FIG. 2A but calculated at the nominal focal plane A of FIG. 1. Here, there is a central focal spot (maximum) on the optic axis having a $1/e^2$ diameter of about 22 μm. The focal spot has an annular pedestal formed by a single interference ring about the central spot.

It is emphasized here that the examples of FIGS. 2A, 2B, 2C and 2D are selected to illustrate the interference modulation of the beam of FIGS. 1A and 1B. Such radial intensity modulation does not occur only in these selected planes, but occurs in any plane between the lens and the above discussed first plane of observation a short distance from the lens.

FIG. 3A and FIG. 3B are graphs schematically illustrate the calculated radial distribution of intensity in planes B and A, respectively, when beam 14X has a diameter $D_3$ or less, where the effect of spherical aberration is negligible. The absence of fringes (modulation) in FIG. 3 indicates that there are no intersecting rays, which indicates that spherical aberration effects are indeed negligible. This is confirmed in FIG. 3B by the single focal spot having an about Gaussian distribution. Nevertheless, using the prior-art beam of FIGS. 3A and 3B it was not possible to generate an extended filament under any pulse conditions, with any number of pulses per burst, and with any axial position of the nominal focus within or without glass-sheet Using the example of the inventive apparatus with the over-filled lens 20, and with bursts of between 2 and 10 pulses of various energies, it was found possible to produce extended filaments in several different glasses, including chemically strengthened glass, for various locations of the principle focus PF in the glass-sheet. It was found, however, that the location of the principle focus in the glass had a strong influence on the length of the extended filaments produced. A discussion of this is set forth below with reference to FIG. 4.

FIG. 4 schematically illustrates nineteen filaments (numbered 1-19) sequentially formed by an example of the apparatus of FIG. 1 in a soda-lime glass-sheet having a thickness of about 3.9 mm. Each filament was formed by a burst of 5 pulses each thereof having an energy of about 70 μJ, for a total energy per burst of 350 μJ. Pulses in the burst were temporally separated by 20 ns. Lens 20 was a 50 mm nominal-focus lens. The lens diameter was 25 mm, with the expanded beam filling the clear-aperture of 24 mm to exploit inherent spherical aberration. Note that although the glass-sheet appears tilted with respect to the beam, the beam was delivered at normal incidence to the sheet. Surface cracks and other imperfections result from preparation of the sample for microscopy, and were not caused by the laser irradiation.

Filament 1 (barely visible) was generated with the principle focus (PF in FIG. 1) on the entrance surface of the sheet. The focus depth in the sheet was progressively increased for subsequent filaments. The lens was moved closer to the glass-sheet in increments of 200 μm (0.2 mm). The nominal focus position in the glass shifted correspondingly, physically, in smaller increments, due to the refractive index of the glass. The longest filaments are filaments 12 and 13, which each have a length of about 3.1 mm. These were produced with the focusing lens moved 2.2 mm and 2.4 mm, respectively, closer to the entrance surface of the glass-sheet. Clearly, in the case of filaments 12 and 13, the front (closest to the exit-surface) of the filaments is ahead of the principle focus in the propagation direction of the laser-beam. The filaments grow toward the entrance surface during delivery of the pulse burst due to a cumulative effect of pulses in the burst.

The filaments of FIG. 4 were created with the glass-sheet stationary during delivery of each burst. In a practical cutting arrangement, the glass-sheet would be continuously translated with respect to the beam. In this case, the translation speed becomes critical for any set of burst parameters, and must be slow enough that pulses in a burst are not laterally displaced sufficient that the cumulative effect of the pulses in the burst is lost. Nevertheless, with the above exemplified 20 ns-separation of pulses in a burst, from the above exemplified laser, it has been found possible to translate the glass-sheet at a rate of about 500 millimeters per second (mm/sec), while still generating filaments of the length and quality indicated by filaments 12 and 13 of FIG. 4.

In summary, the present invention is described in terms of a preferred embodiment with practical examples. The invention is not limited, however, to the embodiment and example described and depicted herein. Rather the invention is limited only by the claims appended hereto.

What is claimed is:

1. A method of cutting a glass-sheet comprising the steps of:
    generating a burst of laser pulses, each pulse having a duration of about 15 picoseconds or less with a temporal separation therebetween of about 100 ns or less, the pulses being generated in the form of a collimated beam;
    focusing the collimated beam with a single-element plano-convex lens to form a focused beam, said single-element plano-convex lens having a plane-surface and a convex-spherical surface, said single-element plano-convex lens having a clear aperture and an optic axis;
    directing the focused beam into the glass-sheet, said glass-sheet having an entrance surface through which the focused beam enters the glass-sheet and an exit surface through which the focused beam leaves the glass-sheet; and
    wherein prior to entering the single-element plano-convex lens, expanding the diameter of the collimated beam to fill the clear aperture of the single-element plano-convex lens to exploit uncorrected spherical aberrations in the single-element plano-convex lens to form a plurality of foci extending along the optic-axis, and wherein the burst of laser-pulses in the plurality of foci generates an elongated filament in the glass-sheet.

2. A method as recited in claim 1, wherein the number of pulses in the burst of laser pulses is between 2 and 10.

3. A method as recited in claim 1, wherein the single-element plano-convex lens has a nominal focus that is positioned between the entrance and exit surfaces of the glass-sheet.

4. A method as recited in claim 1, wherein the single-element plano-convex lens has a nominal focus that is positioned below the exit surface of the glass-sheet.

5. The method as recited in claim 1, wherein the elongated filament extends from the entrance surface of the glass-sheet to a point between the entrance and exit surfaces of the glass-sheet.

6. The method as recited in claim 1, wherein the elongated filament extends from a point between the entrance and exit surfaces of the glass sheet to the exit surface of glass-sheet.

7. The method as recited in claim 1, wherein the generating, focusing, and directing steps are repeated, the bursts of laser pulses having a burst-repetition frequency between 100 and 500 kilohertz.

8. The method as recited in claim 7, wherein the glass-sheet is translated with respect to the beam to create an array of elongated filaments.

9. The method as recited claim 8, wherein the glass-sheet is cut along a line defined by the array of elongated filaments.

* * * * *